(12) United States Patent
Riskin et al.

(10) Patent No.: US 11,494,557 B1
(45) Date of Patent: Nov. 8, 2022

(54) SYSTEM AND METHOD FOR TERM DISAMBIGUATION

(71) Applicant: Verantos, Inc., Menlo Park, CA (US)

(72) Inventors: Daniel Riskin, Menlo Park, CA (US); Anand Shroff, San Carlos, CA (US)

(73) Assignee: Verantos, Inc., Menlo Park, CA (US)

( * ) Notice: Subject to any disclaimer, the term of this patent is extended or adjusted under 35 U.S.C. 154(b) by 0 days.

(21) Appl. No.: 17/581,498

(22) Filed: Jan. 21, 2022

Related U.S. Application Data (60) Provisional application No. 63/189,340, filed on May 17, 2021.

(51) Int. Cl.
  *G06F 40/247* (2020.01)
  *G06N 5/02* (2006.01)
  *G06F 40/40* (2020.01)

(52) U.S. Cl.
  CPC ........... *G06F 40/247* (2020.01); *G06F 40/40* (2020.01); *G06N 5/022* (2013.01)

(58) Field of Classification Search
  CPC ...... G06F 40/247; G06F 40/40; G06F 40/242; G06F 40/30; G06F 16/951; G06F 40/274; G06F 40/284; G06F 16/3329; G06F 16/367; G06F 16/374; G06F 12/0246; G06F 12/0811; G06F 12/0815; G06F 12/0848; G06F 12/0882; G06F 12/1063; G06F 16/3338; G06F 17/16; G06F 17/18; G06F 2212/1008; G06F 16/21; G06F 16/28; G06F 16/284; G06F 16/29; G06F 16/313; G06F 16/3331; G06F 16/3347; G06F 16/95; G06F 16/955; G06F 40/146; G06F 40/205;
  (Continued)

(56) References Cited

U.S. PATENT DOCUMENTS

| | | | |
|---|---|---|---|
| 7,028,038 B1 * | 4/2006 | Pakhomov | G06F 40/284 707/765 |
| 9,015,031 B2 * | 4/2015 | Ferrucci | G06F 40/30 704/7 |

(Continued)

OTHER PUBLICATIONS

International Search Report and Written Opinion for PCT/US2022/013345 dated May 11, 2022, 8 pages.

(Continued)

*Primary Examiner* — Abdelali Serrou
(74) *Attorney, Agent, or Firm* — Sheppard Mullin Richter & Hampton LLP (57) ABSTRACT

Systems and methods are described for disambiguating terms, a challenging problem in computational linguistics. An ambiguous term may be regular words or phrases, or preferably abbreviations or acronyms. A potentially ambiguous term may be identified from an information source, and has two or more potential meanings. For each potential meaning, context and frequency of the potential meaning are determined. Context may include section headings, nearby concepts, or all relevant concepts within the information source. Frequency may reflect frequency of the candidate concepts within literature, medical literature, patient records, or another information source. Context, frequency, or both for each potential meaning can support a computer technology algorithm to select one potential meaning over others.

5 Claims, 3 Drawing Sheets

(58) Field of Classification Search
CPC ..... G06F 40/216; G06F 40/253; G06N 5/022; G10L 15/1822; G10L 2015/221; G10L 15/22; G10L 15/26; G16H 10/60; G16H 15/00; G16H 10/20; G16H 50/30; G16H 70/00
See application file for complete search history.

(56) References Cited

U.S. PATENT DOCUMENTS

| | | | | |
|---|---|---|---|---|
| 9,213,687 | B2* | 12/2015 | Au | G06F 40/237 |
| 9,959,328 | B2* | 5/2018 | Jain | G06F 40/30 |
| 10,592,505 | B2* | 3/2020 | Galitsky | G06F 16/24522 |
| 10,679,008 | B2* | 6/2020 | Dubey | G06F 16/3347 |
| 2005/0033569 | A1* | 2/2005 | Yu | G06F 40/274 704/10 |
| 2005/0080613 | A1 | 4/2005 | Colledge | |
| 2008/0109454 | A1* | 5/2008 | Willse | G06F 16/313 707/E17.084 |
| 2009/0006359 | A1* | 1/2009 | Liao | G06F 16/374 707/999.005 |
| 2009/0259629 | A1* | 10/2009 | Wei | G06F 16/3338 |
| 2012/0084076 | A1* | 4/2012 | Boguraev | G06F 40/274 704/9 |
| 2013/0110500 | A1* | 5/2013 | Feng | G06F 40/40 704/9 |
| 2017/0017635 | A1* | 1/2017 | Leliwa | G06F 40/258 |
| 2017/0109438 | A1* | 4/2017 | Oliver | G06F 40/284 |
| 2017/0199963 | A1* | 7/2017 | Kondadadi | G16H 15/00 |
| 2017/0213222 | A1* | 7/2017 | Rajpathak | G06F 40/216 |
| 2020/0073996 | A1* | 3/2020 | Wright | G06N 5/022 |
| 2020/0104360 | A1* | 4/2020 | Gahlot | G06F 16/374 |
| 2022/0068493 | A1* | 3/2022 | Potter | G16H 50/20 |

OTHER PUBLICATIONS

McInnes et al., "Knowledge-based methods for determining the meaning of ambiguous biomedical terms using information content measures of similarity", in AMIA Annual Symposium Proceedings, vol. 2011, pp. 895-904, Oct. 24, 2011, [retrieved on Mar. 21, 2022] from the internet: <https://www.ncbi.nlm.nih.gov/pmc/articles/PMC3243213/pdf/0895_amia_2011_proc.pdf>.

Navigli, "Word Sense Disambiguation: A Survey," ACM Computing Surveys (CSUR), 41(2), pp. 10:1-10:69, Feb. 17, 2009, [retrieved from the internet on Mar. 21, 2022] <http://citeseerx.ist.psu.edu/viewdoc/download?doi=10.1.1.153.8457&rep=rep1&type=pdf>.

Stevenson et al., "Disambiguation of ambiguous biomedical terms using examples generated from the UMLS Metathesaurus", Journal of Biomedical Informatics, vol. 43, pp. 762-773.

* cited by examiner

SYSTEM AND METHOD FOR TERM DISAMBIGUATION

CROSS-REFERENCE TO RELATED APPLICATIONS

This application is claims the benefit under 35 U.S.C. § 119(e) of U.S. Application No. 63/189,340, filed May 17, 2021, the contents of which are incorporated by reference in their entirety.

BACKGROUND

In computational linguistics, word sense disambiguation concerns identifying which sense of a word is used in a sentence. The human brain is quite proficient at word sense disambiguation. In computer science, it has been a long-term challenge to develop the ability in computers to disambiguate.

A related but more challenging problem in computational linguistics is abbreviation sense disambiguation, or simply abbreviation disambiguation. Abbreviation disambiguation is the logic that determines which of an abbreviation senses is the most relevant for a given instance of an abbreviation.

Many abbreviations and acronyms are ambiguous with respect to their sense, and constitute a significant part of the general problem of text normalization. In particular, clinical narrative notes are rich in abbreviations and acronyms. This allows for faster data entry, but makes language ambiguous. It has been shown that over one third of UMLS (Unified Medical Language System) Metathesaurus abbreviations have multiple meanings. Moreover, the same abbreviation can have different meanings in different healthcare institutions, in different medical specialties, between different healthcare practitioners, and even in the same clinical note.

For example, "mg" may mean milligrams or myasthenia gravis. In the "Labs" section of a clinical note, in the sentence "105 mg while fasting" mg may mean milligrams. In the "History of Present Illness" section, however, "the PT suffered mild mg," is more likely to reference myasthenia gravis. Here, a simple but only partial solution is to treat mg following a number, such as in "100 mg" as milligrams.

In another example, "CP" may be either chest pain or cerebral palsy. Since both chest pain and cerebral palsy relate to medical conditions and can be used in similar contexts, there may be no simple way to determine whether, in a particular instance, CP means chest pain or cerebral palsy. An extreme example is "RA" which may have up to 17 different meanings, such as "rheumatoid arthritis," "renal artery," "right atrium," "right atrial," "refractory anemia," "radioactive," "right arm," "rheumatic arthritis," "ragweed antigen," "refractory ascites," and "renin activity".

As noted, such challenges are not unique to the healthcare field. For instance, "ad" can mean advertisement, Anno Domini, or advantage. "SAT" may mean the standardized college admissions test or Saturday, both of which are frequently used.

Many techniques have been proposed, from dictionary-based methods that use the knowledge encoded in lexical resources, to supervised machine learning methods in which a classifier is trained for each distinct abbreviation or acronym on manually curated examples, to completely unsupervised methods that cluster occurrences of abbreviations or acronyms. Each of these techniques, however, has major flaws or performance issues.

SUMMARY

The present technology provides systems and methods for disambiguating terms. An ambiguous term may be regular words or phrases, or preferably abbreviations or acronyms, which may be identified from an information source, and have two or more potential meanings. For each potential meaning, context and frequency of the potential meaning are determined. Context may include section headings, nearby concepts, or all relevant concepts within the information source. Frequency may reflect frequency of a single concept or of two or more concepts, which are associated with the potential meaning, co-occurring based on one or more other information sources. Context, frequency, and/or other factors for each potential meaning can support a computer technology algorithm to select one potential meaning over others.

In accordance with one embodiment of the present disclosure, provided is a method for disambiguating a term. The method, in some embodiments, entails extracting, from an information source, a listing of concepts and an ambiguous term having two or more potential meanings; identifying, from the listing of extracted concepts, ones that are associated with each of the potential meanings, according to a knowledge set that defines associated concepts; and determining one of the potential meanings as the actual meaning for the ambiguous term, at least in part based on the relationship to associated concepts, thereby disambiguating the term. In some embodiments, the information source includes clinical information.

In some embodiments, the relationship to associated concepts includes the count of associated concepts. In some embodiments, the relationship to associated concepts includes the strength of association to each of the associated concepts. In some embodiments, the relationship to associated concepts further includes direction of the association to each of the associated concepts.

In some embodiments, the method further entails obtaining a frequency of use for each of the potential meanings, wherein determination of the actual meaning for the ambiguous term is further based on the frequencies. In some embodiments, the frequency of use for a potential meaning is within the resources upon which the knowledge set is built. In some embodiments, the frequency of use for a potential meaning is specific to a particular section or header of the information source.

In some embodiments, the knowledge set that defines associated concepts includes associations as groups. In some embodiments, the knowledge set that defines associated concepts includes a numeric strength of association. In some embodiments, use of the knowledge set that defines associated concepts requires a minimum threshold strength of association.

DETAILED DESCRIPTION

Rooted in computer technology, the present disclosure provides an improved approach for disambiguating terms, which may be regular words, or preferably abbreviations or acronyms. In one embodiment, the technology is able to disambiguate a term that is of interest. In some scenarios, a computational linguistic study is interested in interpreting the entire text of an information source (e.g., a medical narrative), and thus likely every word is included, and every ambiguous term needs to be disambiguated.

A potentially ambiguous term is identified (e.g., step 104 of FIG. 1 which illustrates a process 100 for disambiguating a term) from an information source (e.g., an article, a written note, or part or all of an electronic medical record, illustrated as 102). The ambiguous term has two or more potential meanings. In one embodiment, for each potential meaning, context and frequency of the potential meaning are determined. Context may include section headings, nearby concepts, or all relevant concepts within the information source. Frequency may reflect frequency of a single concept or of two or more concepts, which are associated with the potential meaning, co-occurring based on one or more other information sources. Context, frequency, or both for each potential meaning can support a computer technology algorithm to select one potential meaning over others.

I. Knowledge Sets

Whether a concept is associated with another concept can be determined with one or more knowledge sets (e.g., 126 of FIG. 1) that define associations between concepts, which can be built (e.g., step 122 of FIG. 1) with a process as illustrated below (see also FIG. 2). The following description uses a clinical knowledge set as an example, but it is readily appreciated that the construction and use of the clinical knowledge set are likewise applicable to knowledge sets of other subjects.

A clinical knowledge set can be built from medical information sources (illustrated as 120 in FIG. 1), such as electronic health records and medical literature, to support natural language processing (NLP) and inference. Once built, the clinical knowledge set can be stored in a database and be queried during other processes of the present technology.

The clinical knowledge set can be helpful in defining the existence or even strength of relationships between clinical concepts. This is more than the conventional concept relationship based on natural language meanings. Take a conventional concept relationship as an example. The concept "diabetes with peripheral neuropathy" defines a patient having diabetes and a sequela of diabetes, peripheral nerve disease. Both "diabetes" and "peripheral neuropathy" are standard concepts defined in conventional concept relationship databases, such as SNOMED CT (Systematized Nomenclature of Medicine-Clinical Terms), which provide hierarchical relationships between these concepts. Concepts may also include abbreviations, which are associated with one or more corresponding terms. For instance, "CHF" can be associated with "congestive heart failure."

The clinical knowledge set of the present disclosure is further improved over the conventional hierarchical relationship databases in that it addresses multiple deficiencies of those conventional databases. First, manually curated knowledge databases are limited by expensive clinician time. For example, SNOMED maintains a handful of relationships per concept. But, most concept relationships are not known if there are billions of concept relationships in healthcare, it is impossible to manually curate a database of these.

Second, the conventional hierarchical relationships provide no information about the strength of a relationship. It simply notes whether a relationship exists. For example, if a doctor writes "nausea and vomiting after eating spoiled meat," the nausea and vomiting are likely due to food poisoning (probability ~=0.99). But, if the doctor writes, "History of diabetes and migraine headaches, now presenting with peripheral numbness." Should one link headaches to the peripheral numbness (probability ~=0.05)? What about diabetes and peripheral numbness (probability ~=0.85)?

Third, multiple associations (e.g., many-to-one rules) and chronological relationships are generally not available in a conventional hierarchical relationship database. Moreover, the time course of associated concepts is also not provided in the conventional hierarchical relationship databases.

Fourth, in conventional hierarchical relationship databases, there is little directionality. For example, chest pain may almost always occur with heart attack, but heart attack does not always occur when there is chest pain. Directional understanding of likelihood of relationship becomes important when distinguishing likelihood that concepts are related.

Figure 2:
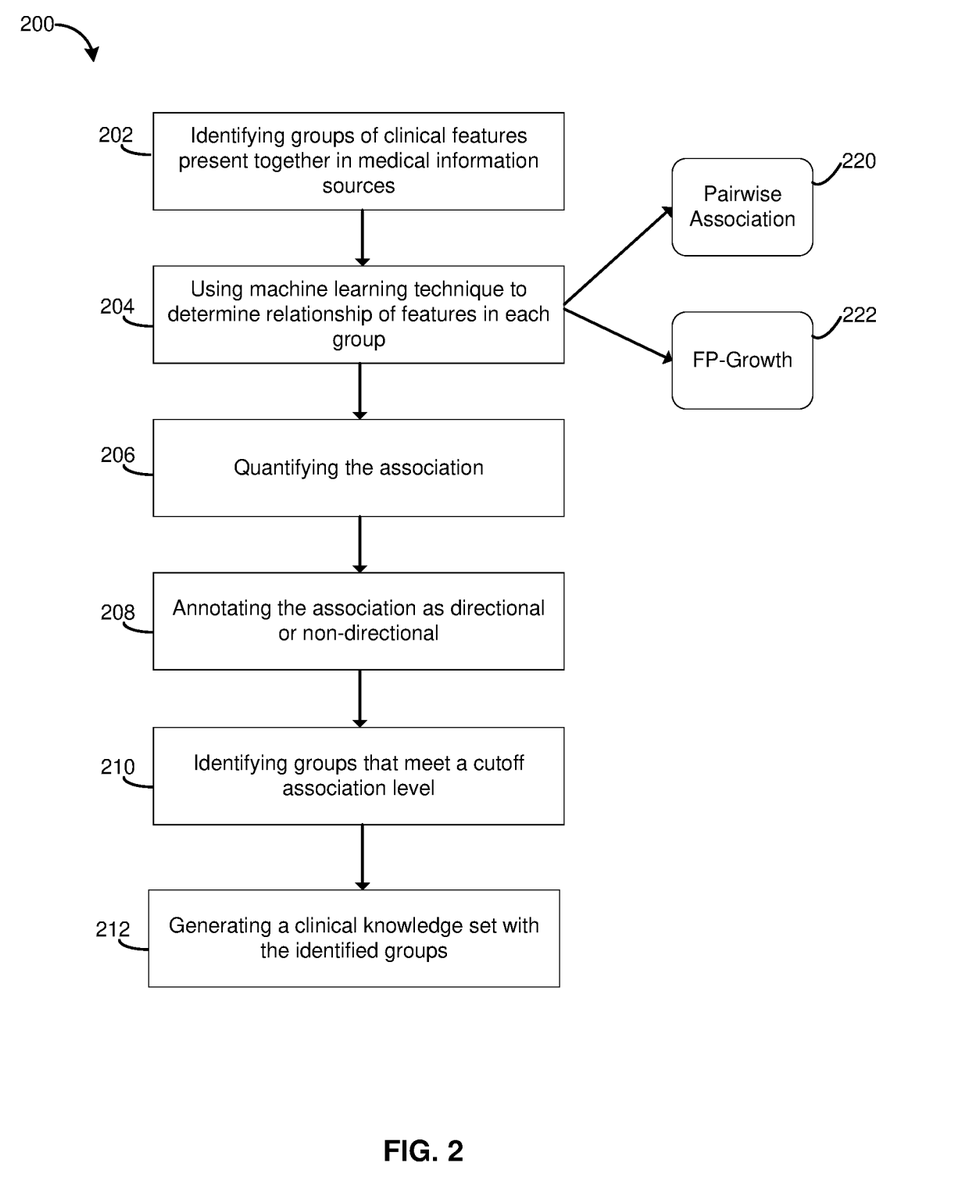
FIG. 2 illustrates an example process of building a knowledge set that defines associations between concepts.

The clinical knowledge set of the present disclosure, in one embodiment, includes groups of potentially associated clinical concepts, which can be identified from medical information sources (e.g., step 202 of FIG. 2, which illustrates a process 200 for building a knowledge set). Some of the groups may include only two concepts ("concept pairs," e.g., the pair of fever and infection) while others can include multiple concepts ("concept groups," e.g., the group that includes myocardial infarction, EKG, and troponin). The initial groups of potentially associated clinical concepts can be built with relatively relaxed requirements from medical information sources, which can then be evaluated and filtered.

Medical information sources, without limitation, can include medical records (e.g., electronic health records) and medical literature. Both structured and unstructured data from the medical records may be used. Medical literature can include peer-reviewed medical journal articles, books, online publications, conference abstracts, and government reports, without limitation. In some scenarios, multiple records or documents may be concatenated into a single document. This can increase co-occurrence frequency, which is described in more detail below. In particular, the concatenation can be carried out for related records, such as the medical records for the same patient at different times.

Concerning generation of the initial concept groups of potentially associated concepts, for instance, all clinical concepts that appear in a single sentence can be drawn into an initial group. In another example, a clinical concept that appears most frequently in a medical record or literature can be first chosen as a seed for a group, and then all concepts that appear within a certain distance from the seed can also be included in the group (step 202).

The initial groups can then be evaluated with respect to the association between the concepts in the groups, using machine learning techniques (e.g., step 204 of FIG. 2). Concept association can be considered frequent itemset mining, for which pairwise association, a priori and FP (frequent pattern)-Growth are useful evaluation methods.

An example form of concept association is pairwise co-occurrence counts (e.g., option 220 in FIG. 2). In this method, the number of times two concepts appear in the same document (e.g., a medical record, or a medical article). Another example evaluation, and also group generation and growing, method is FP-Growth (e.g., option 222 in FIG. 2). FP-Growth defines a tree structure that is subsequently reduced to find frequent itemsets. It does not need to find all itemsets of order n in order to find those of order n+1. In this way, it is much more efficient for finding many-to-one relationships.

Specific measurement parameters can also be used to quantify the association between concepts (e.g., step 206 in FIG. 2). One such parameter, referred to herein as "lift," is a ratio of actual co-occurrence to expected co-occurrence. For example, myocardial infarction and chest pain may occur frequently within the same encounter or longitudinal record. If actual co-occurrence is 10% and expected co-occurrence (by random chance) is 0.1%, then the lift is 100. This is a signal suggesting a real association. Expected co-occurrence may be calculated based on actual frequency of occurrence of each concept within the dataset, by prevalence of concepts within the medical literature, or by another means.

Another parameter is average token distance, which measures the average distance between pair occurrences. For example, cough may co-occur frequently with hypertension, but they may be far apart in the longitudinal record. They may be on average 20 words apart. On the other hand, myocardial infarction and chest pay may co-occur at an average of 5 words apart, typically because they are mentioned in the same sentence. This is a signal suggesting a real association. As alternatives to average token distance, median token distance, minimum token distance and maximum token distance may also be used, without limitation. Tokens may be terms that resolve to clinical concepts, may be words, or may be another measure of text distance.

Additional factors may also be considered when filtering the groups. For instance, if a pair or group of concepts can map to associated concepts in a conventional concept relationship database, such as SNOMED CT, then such a pair or group can be considered to have strong or confirmed association between the group members. An example relationship in SNOMED CT is being a child or a grandchild of the associated concept.

In some embodiments, an association value may be used to reflect the strength of association. In some embodiments, the association value may be between 0 and 1 where 1 is the strongest association. For example, due to co-occurrence and relative distance between cough and pneumonia, these may have an association value of 0.7 whereas the association value of a cough-diabetes pair may be 0.2 because these co-occur less often and less closely and are less likely to be related.

In some embodiments, each association can be further annotated as directional or non-directional (e.g., step 208 in FIG. 2), which can be reflected from the association value calculated. For example, chest pain in the presence of myocardial infarction may be far more likely than myocardial infarction in the presence of chest pain since most patients with a heart attack have chest pain but most patients with chest pain do not have a heart attack.

These parameters, e.g., lift and token distance, can be used to filter the groups (e.g., step 210 in FIG. 2). The filtration can be done with predetermined threshold values, or threshold values determined on the fly, e.g., to limit the number of groups. For instance, a threshold lift value may be 5, and a maximum average token distance threshold may be 20 tokens. Upon such thresholding to remove groups having weak or lacking associations, the clinical knowledge set can be considered generated (e.g., step 212 in FIG. 2).

In some embodiments, each concept in the knowledge set may be further annotated with respect to its frequency of occurrences in the medical information sources.

II. Identification of Ambiguous Terms

Identification of terms including ambiguous terms (e.g., step 104 of FIG. 1), from an information source (e.g., 102) may require understanding of grammar and common text. Identification of concepts based on terms may require specialized understanding of natural language.

Using healthcare as an example subject, information sources from which the terms and concepts are identified can be electronic health records, patient reported outcomes, sensors, or other medical content, without limitation. It is readily appreciated that the medical information often includes both structured data and unstructured data. Structured data includes problems, medication, lab, and other coded lists. Unstructured data typically constitutes the majority of electronic health record content, including physician notes, other narratives, and audio and graphic records.

Simple text matching can be done with text matching software against known words and phrases in a suitable vocabulary, such as the clinical knowledge set. A more robust approach, natural language processing, may recognize subject or negations as in "a brother with cancer" or "no hypertension."

Identification of ambiguous terms requires a lexicon that includes and provides potential definitions for such terms. In some embodiments, an ambiguous term is an abbreviation (e.g., cor, which may be the abbreviation for coronary, cortical, or another concept). In some embodiments, an ambiguous term is an acronym (e.g., mg, which may be an acronym for myasthenia gravis, milligram, or another concept). In some embodiments, an ambiguous term is a regular word having two or more unrelated meanings (e.g., band, which may mean a medical strap or a group of musicians). The lexicon can be used to identify all ambiguous terms appearing in the information source.

Extracted concepts may undergo natural language processing, in some scenarios. Non-limiting examples of cleanup and tagging during natural language processing include removal of special characters, tokenization, sentence splitter, part-of-speech tagger (e.g., tags tokens with part of speech tags such as adjectives, proper nouns), named entity recognition (which matches tokens against an internal map of entities); and negation and subject tagging.

III. Determination of Context Using Associated Concepts

For an ambiguous term, in one embodiment, concepts that are associated with each of its potential meanings are identified. Each of these associated concepts is preferably non-ambiguous. For instance, the term "cor" may mean coronary or cortical. For the potential meaning of coronary, associated concepts may be artery, vein, and heart. For the potential meaning of cortical, associated concepts may be cortex and neuron. Identification of these associated concepts, in some embodiments, is carried out within the same information source from which the ambiguous term is found.

As described above, the association between concepts may be defined in one or more knowledge sets. Accordingly, in one embodiment, a knowledge set is searched to generate a listing of associated concepts for each potential meaning (a concept on its own) of an ambiguous term. For each associated concept in this listing, it can be determined whether it occurs in the information source from which the ambiguous term is identified, and how many times it occurs. In some embodiments, the sum of these occurrences is calculated which can represent the "support" of the corresponding potential meaning, which can be used to select a well-supported potential meaning as the actual meaning (e.g., step 106 of FIG. 1).

Take the ambiguous term "cor" as an example again. From the medical record of a particular patient wherein "cor" is found, the concept "artery" occurs 2 times, the concept "vein" occurs 0 time, and the concept "heart" occurs 5 times. In addition, the concept "coronary" itself occurs 1 time. The total support of the potential meaning "coronary," therefore, is 8. Meanwhile, the concept "cortex" occurs 1 time, and the concept "neuron" occurs 0 time. The support of the potential meaning "cortical," therefore, is 1. This suggests that, within the context of the medical record of this patient, "cor" is more likely intended to mean "coronary" than "cortical," as "artery" provides more support for coronary than for cortical. The context of the narrative supports coronary more than cortical.

In the knowledge set, different associations may have different strengths. For instance, the coronary/artery association may have a strength score of 0.6, and the coronary/heart association may have a strength score of 0.9. A strength score of 1 may be given to itself, i.e., coronary/coronary. Taking this into consideration, accordingly, the support of the potential meaning "coronary" is 2×0.6 (artery)+0 (vein)+ 5×0.9 (heart)+1*1 (coronary)=6.7. Likewise, if the cortical/cortex association has a strength score of 0.8, then the support of the potential meaning "cortical" is 1×0.8 (cortex)+0 (neuron)=0.8. In this case, the context of the narrative is more focused on cardiology issues than on neurology issues and thus the context supports coronary over cortical.

In some embodiments, when the knowledge set includes strength quantitation for each association, a cutoff value may be used to only select associated concepts that pass that cutoff value. In other words, remotely associated concepts may not need to be included in the frequency calculation. In some embodiments, the directions of the associations may also be used to select associated concepts, or when calculating the frequencies.

In one embodiment, all concepts within the information source that are relevant to a potential meaning is considered to define context. For instance, the term "MG" may mean milligrams or myasthenia gravis. As "myasthenia gravis" is a clinical concept relating to neuromuscular diseases, all concepts relating to neuromuscular diseases (relevant concepts) in the information source can be identified. If indeed a meaningful number of concepts relating to neuromuscular diseases (e.g., weakness, auto-immune) are found, then the "MG" here likely means myasthenia gravis.

In another embodiment, only nearby concepts are considered, or alternatively the nearby concepts are given higher weights than other concepts in the information source. For instance, if the paragraph where "MG" occurs also includes concepts such as mL, IU, min and/or %, the "MG" here likely means milligrams as this paragraph sets a context of lab testing results. By contrast, if the paragraph includes concepts such as weakness and fatigue, then the "MG" here likely means myasthenia gravis.

Section headings, in some embodiments, are used to define the context where the ambiguous term occurs. For instance, if "MG" appears under a past medical history section, it likely means myasthenia gravis. By contrast, if "MG" appears under a lab testing results section, it more likely means milligrams.

In some embodiments, specific context-based rules may be used. An example rule is that when a number is followed by the term "MG," it is always assumed to be milligrams.

As discussed above, however, the support preferably can be used in combination with other factors in disambiguating a term.

IV. Determination of Frequency Using a Knowledge Database

Figure 1:
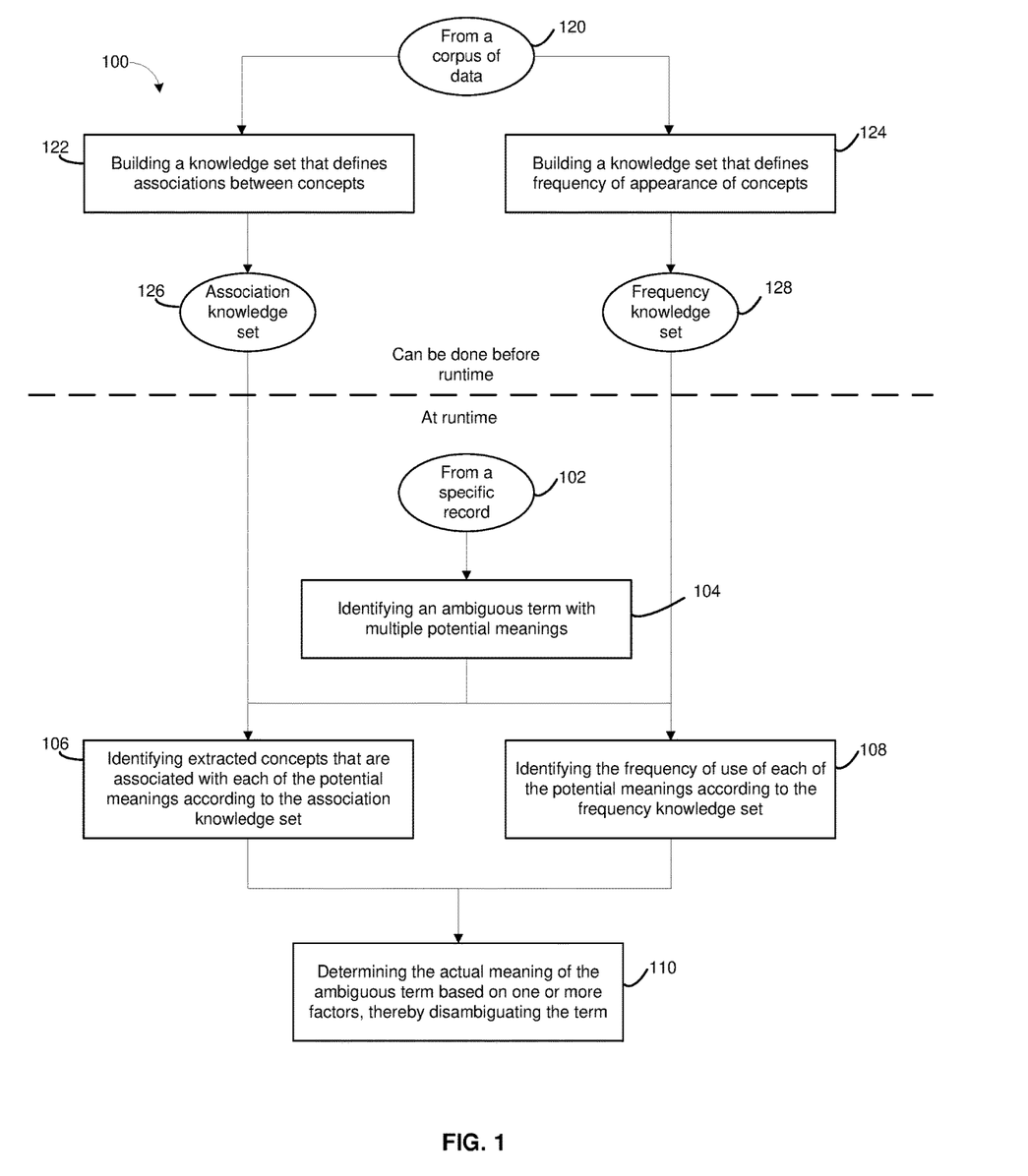
FIG. 1 illustrates an example process of disambiguating a term.

In some embodiments, as illustrated in step 108 of FIG. 1, a frequency table (e.g., 128 of FIG. 1) can be generated (e.g., by process 124 of FIG. 1) that provides a frequency for each potential disambiguation of ambiguous terms from past data ("disambiguation frequency table"). In some embodiments, this table may be generated based on literature, medical literature, medical notes, or another information source. For example, in a corpus of medical text, the term "milligrams" may have appeared 19 times for every 1 time the term "myasthenia gravis" appeared. Here, the disambiguation frequency as milligrams is 0.95, and as myasthenia gravis is 0.05. In this example, if no other information (e.g., contextual support) is considered, one can disambiguate a new occurrence of MG as milligrams, rather than myasthenia gravis, with relatively high confidence (e.g., step 108 of FIG. 1). In some embodiments, frequency is calculated based on full terms such as milligram and myasthenia gravis, with ambiguous terms such as mg ignored. In some embodiments, frequency is calculated incorporating manual review and curation. In some embodiments, frequency is specific to a section within a medical note, where myasthenia gravis may be more frequent in a past medical history section and milligram may be more frequent in a medications section.

V. Balancing Multiple Factors and Selecting Disambiguated Concept

In a preferred embodiment, multiple factors are used in concert to disambiguate a term (e.g., step 110 of FIG. 1). It can happen that different factors give rise to different disambiguation results. For instance, based on the disambiguation frequency table, MG is more likely milligrams in general (i.e., 95% chance). In a specific instance, however, the local context (e.g., co-cooccurring with weakness and fatigue in the same paragraph) suggests that the MG likely represents myasthenia gravis. In view of such potential conflicting results, in some embodiments, the present technology further provides techniques to balance the multiple factors to arrive at an optimal solution.

In some embodiments, a technique is used to weight context and frequency. For example, context may be weighted 10× as much as frequency. If the context for milligrams is a support of 8 based on presence of medications and dosages but the context for myasthenia gravis is 10 based on the presence of a patient feeling tired and weak, then milligrams may be selected over myasthenia gravis based on frequency. But, if the context for milligrams is a support of 2 based on presence of a single medication but the context for myasthenia gravis is 30 based on the presence of a patient feeling weak, blurred vision, difficulty swallowing, and other symptoms, then myasthenia gravis may be selected over milligrams, with context overruling frequency.

The weighting may be based on human input such as expert opinions, in some embodiments. In addition or alternatively, the weights may be trained with machine learning approaches. Weighting algorithms may be applied similarly to all ambiguous concepts or different algorithms may be applied based on clinical domain or specific concepts.

With the techniques described above, for an ambiguous term in an information source that has two or more potential meanings, each potential meaning is assessed. The one that is predicted to be more likely to represent the actual concept than any other potential meaning can be selected. The selected potential meaning, therefore, is taken as the disambiguated concept for the ambiguous term.

VI. Computing Systems for Disambiguating Terms

Figure 3:
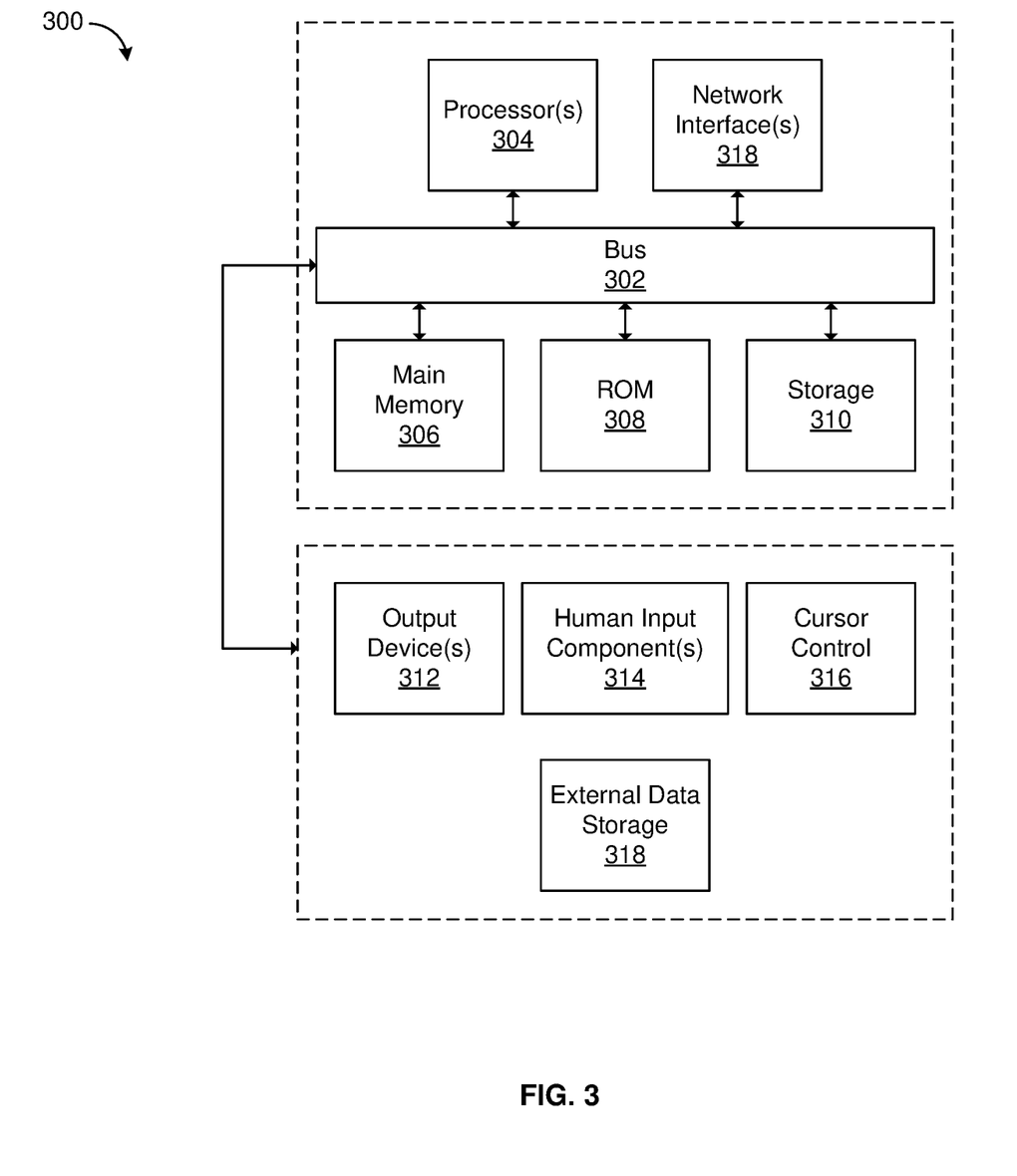
FIG. 3 is a schematic illustrating the computing components that may be used to implement various features of the embodiments described in the present disclosure.

FIG. 3 is a block diagram that illustrates a computer system 300 upon which any embodiments of generation and use of a knowledge set, and its use in disambiguating terms, and related technologies may be implemented. The computer system 300 includes a bus 302 or other communication mechanism for communicating information, one or more hardware processors 304 coupled with bus 302 for processing information. Hardware processor(s) 304 may be, for example, one or more general purpose microprocessors.

The computer system 300 also includes a main memory 306, such as a random access memory (RAM), cache and/or other dynamic storage devices, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

The computer system 300 further includes a read only memory (ROM) 308 or other static storage device coupled to bus 302 for storing static information and instructions for processor 304. A storage device 310, such as a magnetic disk, optical disk, or USB thumb drive (Flash drive), etc., is provided and coupled to bus 302 for storing information and instructions.

The computer system 300 may be coupled via bus 302 to a display 312, such as a LED or LCD display (or touch screen), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. In some embodiments, the same direction information and command selections as cursor control may be implemented via receiving touches on a touch screen without a cursor. Additional data may be retrieved from the external data storage 318.

The computer system 300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and maybe originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor(s) 304 executing one or more sequences of one or more instructions contained in main memory 306. Such instructions may be read into main memory 306 from another storage medium, such as storage device 310. Execution of the sequences of instructions contained in main memory 306 causes processor(s) 304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 310. Volatile media includes dynamic memory, such as main memory 306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a component control. A component control local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may retrieve and execute the instructions. The instructions received by main memory 306 may optionally be stored on storage device 310 either before or after execution by processor 304.

The computer system 300 also includes a communication interface 318 coupled to bus 302. Communication interface 318 provides a two-way data communication coupling to one or more network links that are connected to one or more local networks. For example, communication interface 318 may be an integrated services digital network (ISDN) card, cable component control, satellite component control, or a component control to provide a data communication connection to a corresponding type of telephone line. As another example, communication interface 318 may be a local area network (LAN) card to provide a data communication connection to a compatible LAN (or WAN component to communicated with a WAN). Wireless links may also be implemented. In any such implementation, communication interface 318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet". Local network and Internet both use electrical, electromagnetic or optical signals that carry digital data streams. The signals through the various networks and the signals on network link and through communication interface 318, which carry the digital data to and from computer system 300, are example forms of transmission media.

The computer system 300 can send messages and receive data, including program code, through the network(s), network link and communication interface 318. In the Internet example, a server might transmit a requested code for an application program through the Internet, the ISP, the local network and the communication interface 318.

The received code may be executed by processor 304 as it is received, and/or stored in storage device 310, or other non-volatile storage for later execution. Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the embodiments should, therefore, be construed in accordance with the appended claims and any equivalents thereof.

The various operations of example methods described herein may be performed, at least partially, by one or more processors that are temporarily configured (e.g., by software) or permanently configured to perform the relevant operations. Similarly, the methods described herein may be at least partially processor-implemented, with a particular processor or processors being an example of hardware. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine but deployed across a number of machines. In some example embodiments, the processors may be located in a single geographic location (e.g., within a home environment, an office environment, or a server farm). In other example embodiments, the processors may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method for disambiguating a term, comprising:
generating a knowledge set that includes concepts, and training the knowledge set with information sources that contain the concepts using a machine learning technique, to define weights of associations between the concepts;
extracting, from an information source, a listing of concepts and an ambiguous term having two or more potential meanings;
identifying, from the listing of extracted concepts, ones that are associated with each of the potential meanings, as associated concepts, according to the knowledge set that defines associations between concepts;
assessing a likelihood of each potential meaning representing actual meaning of the ambiguous term, based on (a) a strength of the associations between each associated concept and the potential meaning weighted based on a token distance between occurrences of each associated concept and the potential meaning, (b) a frequency of occurrence of each potential meaning in the knowledge set, and (c) directionality of the association between each associated concept and the ambiguous term, wherein the directionality between two concepts indicates whether the occurrence of one concept more likely leads to the occurrence of the other concept than the reverse,
determining one of the potential meanings having the highest likelihood based on the likelihood assessment as representing the actual meaning for the ambiguous term, thereby disambiguating the term, and
displaying the actual meaning for the term on a user interface.

2. The method of claim 1, wherein the information source includes clinical information.

3. The method of claim 1, wherein the knowledge set that defines associations between concepts includes associations as groups.

4. The method of claim 1, wherein the knowledge set that defines associations between concepts includes a numeric strength of association.

5. The method of claim 4, wherein use of the knowledge set that defines associations between concepts requires a minimum threshold strength of association.

* * * * *